United States Patent [19]

Fatool et al.

[11] Patent Number: 4,621,431
[45] Date of Patent: Nov. 11, 1986

[54] TELESCOPING DEVICE WITH STOP MECHANISM

[75] Inventors: Francis Fatool, Sunbury; William R. Miller, Jr., Danville, both of Pa.

[73] Assignee: Mil-Tool, Inc., Sunbury, Pa.

[21] Appl. No.: 855,727

[22] Filed: Apr. 21, 1986

[51] Int. Cl.⁴ ............................................... G01B 3/08
[52] U.S. Cl. ........................................... 33/161; 33/296
[58] Field of Search ................................... 33/161, 296

[56] References Cited

U.S. PATENT DOCUMENTS

| | | | |
|---|---|---|---|
| 2,356,544 | 8/1944 | Swanson | 33/161 |
| 2,427,841 | 9/1947 | Dichter | 33/161 |
| 2,583,205 | 1/1952 | Boisen | 33/161 |
| 2,947,557 | 8/1960 | Schwab et al. | 33/161 |
| 3,222,789 | 12/1965 | Bishop et al. | 33/161 |
| 3,492,737 | 2/1970 | Swanson | 33/161 |

FOREIGN PATENT DOCUMENTS 41136 1/1908 Switzerland ........................ 33/161

Primary Examiner—Willis Little
Attorney, Agent, or Firm—Ruth Moyerman

[57] ABSTRACT

A telescoping device uses pins resting in grooves to serve as stop means for telescoping tubes. Each of a set of telescoping tubes has at least one groove running longitudinally along the outer tube circumference. A set of two right angled pins rests in a groove, the first pin extending outward through an aperture in the next largest tube's wall, the second pin extending inwardly through a groove aperture to serve as a stop for the next smallest tube. When the tubes are collapsed inwardly, the progress of each tube is stopped by the second pin in the next largest tube. When the tubes are extended outwardly, the progress of each tube is stopped by the abutting of the first and second pins' ends in a groove.

7 Claims, 5 Drawing Figures

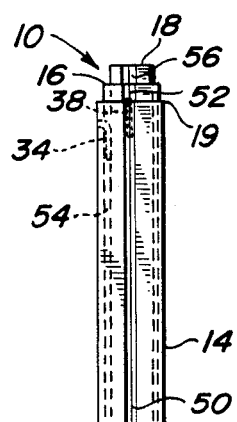
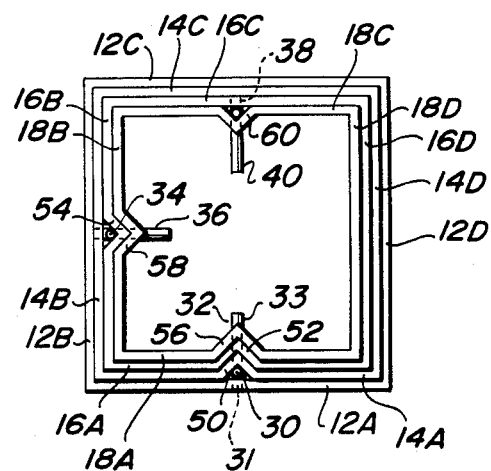
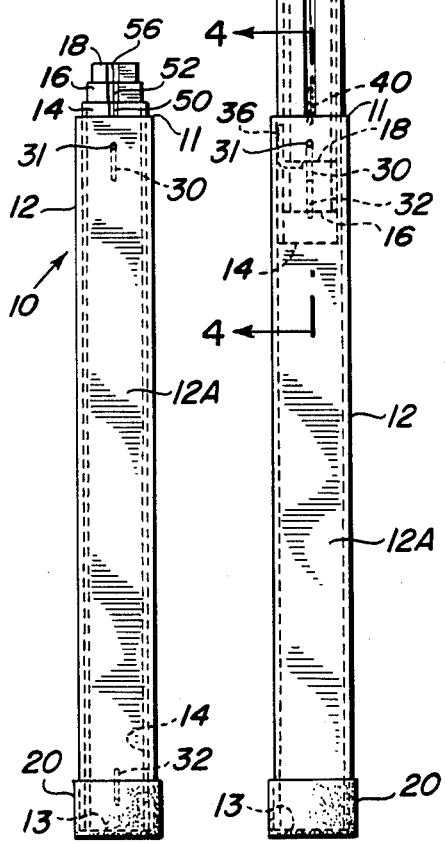
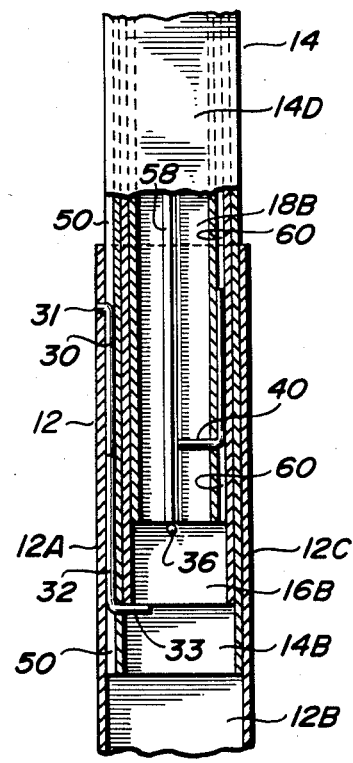

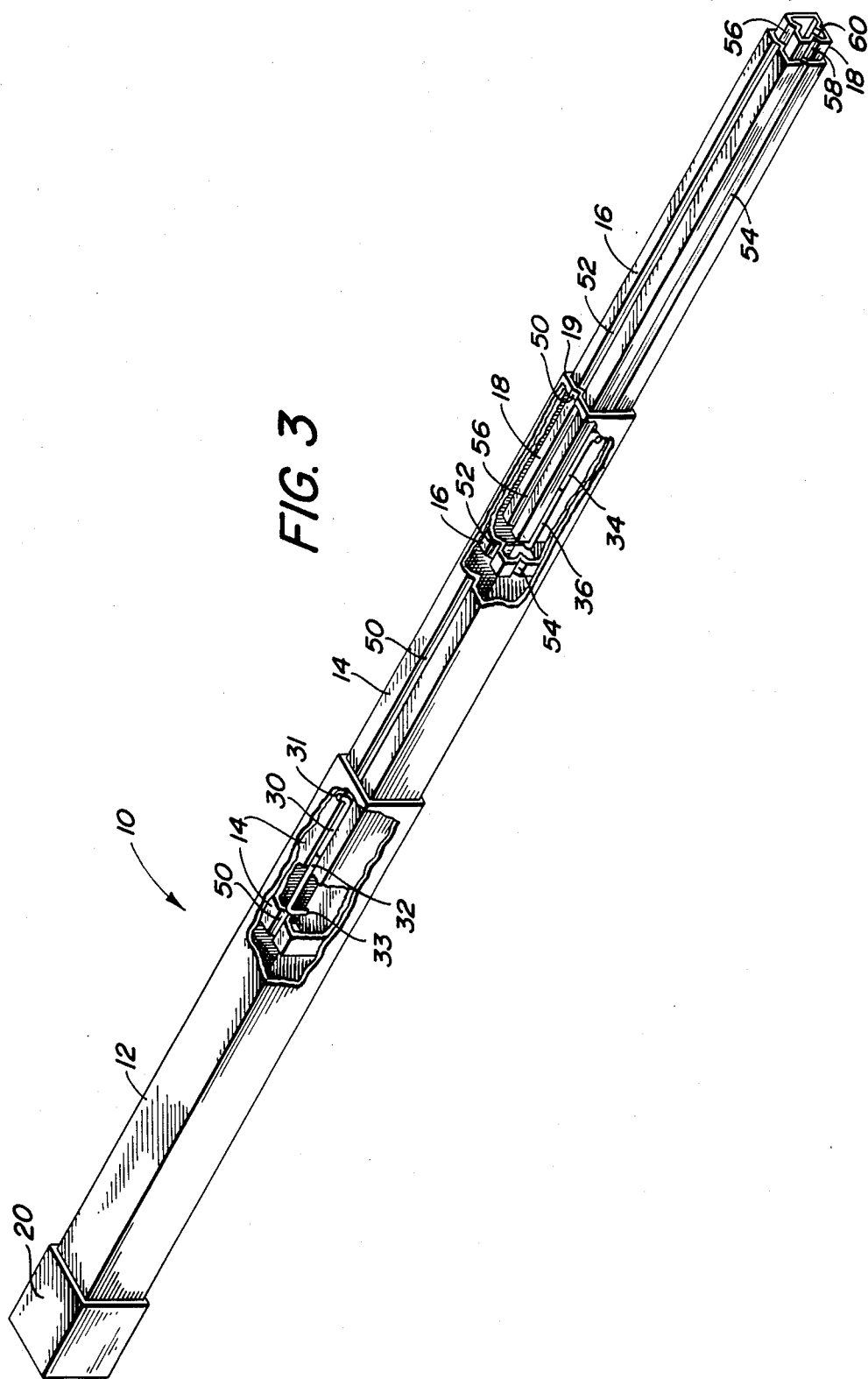

TELESCOPING DEVICE WITH STOP MECHANISM

BACKGROUND OF THE INVENTION

1. Field of the Invention

This invention relates to telescoping devices, and more particularly to stop means for a telescoping device.

2. Background of the Prior Art

There are many telescoping devices on the market today. Many people have a need for an expandable measuring device which will be compact for easy carrying and expand to measure long distances. For this purpose, wind-up tapes and folding measuring sticks are popular. However, those devices often bend or collapse when used by only one person or when pressure is put on them from the holder's end. There is, therefore, a need for a measuring device which telescopes for convenient storage and can be made of lengthy sections for measuring sizable distances, yet remain firmly extended during use.

SUMMARY OF THE INVENTION

The aforementioned prior art problems are obviated by the telescoping device of this invention. A set of interlocking tubes (preferably four tubes, square in transverse cross section) are press fitted in moving registration. The outermost tube is fitted with a cap. The interior tubes have lengthwise grooves, each smaller tube having an additional groove on an additional side. One groove on each tube is fitted with a set of pins. The pins are preferably right angled rods, the long arms of the rods resting longitudinally in the groove. The short arm of one pin is placed transversely through an aperture in the next largest tube. The short arm of the second pin extends transversely through an aperture in the groove into the tube's hollow interior to act as a stop for the next smaller tube. Each tube is prevented from being pulled out when the device is expanded by the long arm of the first pin acting as a stop for the long arm of the second pin.

The telescoping device is preferably made of four pieces to allow one side to remain flat and to receive indicia. However, five pieces, square in cross section, may be used. Other multi-sided tubes also may be used. The number of tubes and their shape depends on the end use of the device.

It is, therefore, an object of this invention to provide a device which is a series of telescoping members.

It is another object of this invention to provide the aforesaid device with reliable stop means to prevent the telescoping members disengaging.

It is another object of this invention to provide a device which may be constructed of plastic which would not be contaminated or harmed when inserted into a gasoline storage tank.

These and other objects will be more readily ascertainable to one skilled in the art from a consideration of the following Figures, description and exemplary embodiments.

BRIEF DESCRIPTION OF THE DRAWING(S)

FIG. 1 shows the preferred embodiment of the telescoping device of this invention completely collapsed.

FIG. 2 is a view of the telescoping device of FIG. 1 with the two largest tubes fully expanded and the two smaller tubes completely collapsed.

FIG. 3 is an isometric view of the device with cut away sections to show the pins engaged to illustrate the stop means.

FIG. 4 is a cross section taken on lines 4—4 of FIG. 2.

FIG. 5 is an end view of the device with all the tubes completely collapsed.

DETAILED DESCRIPTION OF THE PREFERRED EMBODIMENT(S)

Now referring to the drawings, and more particularly to FIG. 1, telescoping device 10 is seen with tubes 12, 14, 16, and 18 completely collapsed. Outermost tube 12 serves as a case for the inner tubes 14, 16, and 18. Cap 20 is seen on proximal end 13 of tube 12. Extending slightly from distal end 11 of tube 12 are the distal ends of tubes 14, 16 and 18. Tubes 14, 16, and 18 are also seen to have grooves 50, 52, and 56 respectively. End 31 of pin 30 is seen flush against outside wall 12A of tube 12. Shown in phantom is pin 32. The operation of pins 30 and 32 will be explained in reference to FIGS. 2, 3 and 4.

The simiplicity of device 10 is well illustrated in FIG. 1. Tubes 14, 16, and 18 collapse inside each other for compact storage and convenience. Cap 20 prevents any of the tubes from falling out of tube 12 which serves as a case for the device. It should be noted, that pins 30, 34, and 38 (of these, only pin 30 is shown in FIG. 1) extend outward through the walls of tubes 12, 14, and 16, respectively, only far enough to be held and to be flush with the exteriors of their respective tubes. Pins 30, 32, 34, and 38 extend through the tubes in pin receiving apertures. These apertures are completely filled with the pins, and, therefore, are not visible in the Figure. Because of the close fit of pins in apertures, tubes 12, 14, 16, and 18 can easily slide in and out of each other without interference from pins 30, 34 and 38.

Because device 10 is preferably square in transverse cross section, each tube has four flat walls on which indicia may be placed. (For the sake of clarity, indicia have not been shown in any of the drawings.) If indicia are used, however, they preferably would be placed on walls 12D, 14D, 16D, and 18D (as seen in FIG. 5.) It is preferred that only one wall on each tube have indicia and that the walls with indicia line up with each other.

The use of grooves 50, 52, and 56 will be explained with reference to FIGS. 2, 3, 4 and 5.

Now referring to FIG. 2, device 10 is seen with tube 14 completely extended from tube 12, and tubes 16 and 18 completely collapsed. Tube 12 is seen to have cap 20 and side 12A. Cap 20 prevents tube 14 from falling out end 13 of tube 12 when tube 14 is completely collapsed inside tube 12. Tube 14 has end 19 and groove 50 which holds pins 32 and 30. In FIG. 2, and in all other Figures, pins 30, 32, 34, 36, 38, and 40 extend through pin receiving means, preferably apertures, in the tubes and the grooves. These apertures, always shown filled with pins, are not visible in any Figure. Pin 30 has short arm end 31 which extends through wall 12A of tube 12. Pins 32 and 30 are seen with their ends abutting in groove 50 so that pin 30 prevents tube 14 from escaping outward from end 11 of tube 12, by stopping forward progress of tube 14.

Also, as will be shown in FIG. 3, each tube is stopped from outward or inward progress by the action of different pins. Tube 14 has groove 50 with pins 30 and 32 running lengthwise in groove 50. Tube 16 has grooves 52 in wall 16A and groove 54 in wall 16B (seen in FIGS. 3 and 5) which holds pins 34 and 36. Tube 18 has groove 56 in wall 18A, groove 58 in wall 18B, and groove 60 in wall 18C (grooves 58 and 60 are shown in FIGS. 3 and 5). Groove 60 holds pins 38 and 40. Each pair of pins in a groove serves to stop the outward progress of one tube and the inward progress of another.

It can be seen in FIG. 2 that telescoping device 10 allows independent action of the tubes. That is, tube 14 may be completely expanded and 16 completely collapsed. Or tube 16 may be completely expanded, and 18 collapsed and 14 collapsed. The user and the purpose of use will determine the tubes to be expanded.

Now referring to FIG. 3, cut-a-way sections are shown to expose the insides of the tubes of device 10. Tube 12 is seen with cap 20. Tube 14 is seen having groove 50 with pins 30 and 32 resting longitudinally in groove 50. Pin 32 has a very short arm 31 which extends through a wall of tube 12. End 31 of pin 30 is flush with the exterior of that wall and pin 30 hangs in groove 50 during all telescoping action of device 10. Pin 32 has a short arm 33 which is longer that short arm 31 of pin 30. Arm 33 extends through groove 50 into the interior of tube 14 of act as a stop for tube 16 when tube 16 is completely collapsed inside tube 14.

In FIG. 3, tube 16 is fully expanded so it does not touch pin arm 33. In FIG. 3, tubes 14 and 16 are completely extended. Tube 14 is prevented from completely escaping from end 11 of tube 12 bu the abutting of pins 30 and 32.

Similarly, tubes 14 and 16 are seen in the mode where tube 16 is completely expanded, but prevented from escaping from end 19 of tube 14 by the abutting of pins 34 and 36 in groove 54 of tube 14. The short arm of pin 36 is a stop for tube 18. The short arm of pin 34 extends out of a wall of tube 14. Tubes 16 and 18 work in the same fashion, employing pins 38 and 40 which are in groove 60 of tube 18 (all not seen in FIG. 3).

Also, in FIG. 3, it can be seen that each succeedingly smaller tube must have an additional groove to accommodate for the pins in the preceding grooves. In the preferred embodiment, tube 14 has groove 50, tube 16 has grooves 52 and 54, and smallest tube 18 has grooves 56, 58, and 60. Pins 38 and 40 are in groove 60 while grooves 56 and 58 accommodate movement of the larger tubes and their pins. Also, in the preferred embodiment, one wall each of tubes 12, 14, 16, and 18 is without grooves and may have indicia marked on it.

Now referring to FIG. 4, a cross section taken on lines 4—4 of FIG. 2, placement of pins in grooves is seen. Tube 14 is shown with groove 50. In groove 50, pins 30 and 32 are abutting, preventing further forward motion of tube 14 in tube 12. End 31 of pin 30 is seen extending through wall 12A of tube 12. Short arm 33 of pin 32 is seen extending through groove 50 into the interior of tube 14 to serve as a stop for tube 16. It can be seen that 62 of tube 16 is engaged by short arm 36 of pin 32. In this view, tube 14 is completely extended forward in tube 12 and tubes 16 and 18 are completely collapsed inside tubes 14 and 16 respectively.

Also seen in FIG. 4 are grooves 58 and 60 with pin 40 extending inward through groove 60.

Now referring to FIG. 5, a top view shows all the tubes in the completely collapsed mode. Each tube is seen to have walls A, B, C, and D. Tube 12 is seen with no grooves. Tube 14 has one groove 50 in wall 14A. Pin 30 with end 31 and pin 32 with arm 33 are in groove 50.

It can be seen that walls 16A and 18A have grooves 52 and 56. Groove 54 is seen in wall 16B holding pins 34 and 36. Wall 18B also has a groove 58. Wall 18C has groove 60 holding pins 38 and 40. It is seen that no other tube has a groove on its wall C. No tubes have grooves on their D walls, and wall D is preferably used for indicia.

There are several variations that may be practiced within the scope of this invention. First, another and smaller tube may be added inside tube 18. In such an embodiment, wall 18D would have a groove and an additional set of pins would be placed in that groove.

The tubes of this invention have been shown square in transverse cross section, but the tubes may be shaped in cross section as any multi-sided figure and the number of tubes adjusted accordingly.

It is preferable to have at least one flat, ungrooved wall for indicia, but this invention is not limited to such an embodiment.

Lastly, this invention has been pictured and described as an independent unit. It should be understood that this device may be used as the leg or arm of another device and still be within the scope of this invention.

There are many advantages to the device of this invention. Chiefly, the telescoping device is easy to manufacture and to use. It is adaptable to a multiplicity of uses and may be formed in a variety of shaped with various numbers of tubes.

Having now illustrated and described my invention, it is not intended that such description limit this invention, but rather that this invention be limited only be a reasonable interpretation of the appended claims.

What is claimed is:

1. A telescoping device with stop mechanism, said telecoping device comprising:
    (a) a plurality of telescoping tubes, each of said tubes having a proximal and a distal end and a plurality of walls, the outermost tube being a case for the interior tubes and including a cap, all of said tubes excluding said innermost tube including pin receiving means in one tube wall at said wall's distal end, said interior tubes also each including at least one lengthwise groove, at least one said groove being in the tube wall adjacent to said wall with said pin receiving means, each of said grooves including at its proximal end a pin receiving means, said largest interior tube having one groove, and each of said other smaller interior tubes having a successive additional groove; and,
    (b) two sets of pins, each set comprising the same number of pins as interior tubes,
        (i) said first pin set having its pins generally right angled rods with a bend proximate one end to create a short and a long arm, said pins in said first pin set adapted to rest longitudinally one each in a groove with said short arm extending transversely through said wall pin receiving means of said next largest tube's distal end so that said short arm's end is flush to the exterior of said next largest tube, said pins thereby held in said pin receiving means during telecoping actions; and
        (ii) said second pin set, also having its pins generally right angled rods except that said second set's short arm being longer than said corresponding arm of said first set, each of said second set's pins' long arms resting longitudinally in a groove of a tube with each of said second set's pins' short arms extending transversely through said groove's pin receiving means into the hollow interior of said tube so that said second pin set's short arms act as a stop for said next smallest tube, whereby, when said device is collapsed, the inward progress of each tube is stopped by the short arm of a pin of the second pin set extending through from said next larger tube, and when said device is expanded, the forward progress of each tube is stopped by the engagement of the long arms of said first and second pin sets in a groove.

2. The telescoping device and stop mechanism according to claim 1 including, additionally, indicia on at least one exterior side of each of said tubes.

3. The telescoping device and stop mechanism according to claim 1 wherein each of said tubes includes at least one flat, smooth side.

4. The telescoping device and stop mechanism according to claim 1 wherein there are a total of four tubes.

5. The telescoping device with stop mechanism according to claim 4 wherein said tubes are generally square in transverse cross section.

6. A telecoping device with stop mechanism, said telescoping device comprising:

(a) four telescoping tubes, said tubes generally square in cross section, each tube having a first wall, a second wall, a third wall, and a fourth wall, each wall having a proximal and a distal end, each first wall aligned in parallel with each other first wall, said first walls opposing said third walls, said fourth walls adjacent to said first walls, said outermost tube being a case for said device and including a cap on said proximal end, said cap providing a stop for said second largest tube, said outermost tube including pin receiving means in said first wall proximate said distal end, said second largest tube including a lengthwise groove on its first wall, said groove including a pin receiving means proximate said groove's proximal end, said second tube also including pin receiving means proximate said distal end of its second wall, said third largest tube including lengthwise grooves on its first and second walls, a pin receiving means in its second wall's groove proximate said groove's proximal end, said third tube's third wall including pin receiving means proximate it distal end, said smallest tube including lengthwise grooves on its first, second, and third walls and pin receiving means in its third wall's groove proximate said groove's proximal end, (b) a first and second pin, said pins generally right angled rods with a bend proximate one end to create a short and a long arm, said second pin's short arm longer than said corresponding arm of said first pin, said pins' long arms resting longitudinally in said groove of said second largest tube with said short arms at said rods' opposing ends, said short arm of said first pin extending transversely through said pin receiving means in said first tube's first wall, said first pin's bent end flush with the exterior of said largest tube, said second pin's short leg extending transversely through said pin receiving aperture in said groove into said second largest tube's interior to act as a stop to prevent said third largest tube from falling out of said second largest tube when said device is retracted, expansion of said second largest tube stopped when said first and second pins abut;

(c) a third and a fourth pin, said pins generally right angled rods with a bend proximate one end to create a short and a long arm, said fourth pin's short arm longer than said third pin's corresponding arm, said long arms of said third and fourth pins resting longitudinally in said groove in said third largest tube's second wall with said short arms at said rods' opposing ends, said short arm of said third pin extending transversely through said pin receiving means in said second tube's second wall, said bent pin end flush with the exterior of said second largest tube, said fourth pin's short arm extending transversely through said pin receiving means in said third largest tube's second wall's groove into said third largest tube'interior to prevent said smallest tube from falling out of said third largest tube when said device is retracted, expansion of said third largest tube stopped when said third and fourth pins abut; and (d) a fifth and a sixth pin, said fifth and sixth pins generally right angled rods with a bend proximate one end to create a short and a long arm, said long arms of said fifth and sixth pins resting longitudinally in said groove in said smallest tube's third wall, said fifth pin's short arm's bent end extending through said pin receiving means in said third tube's third wall, said fifth pin's bend end flush with the exterior of said third tube, said sixth pin's short arm extending transvesely through said pin receiving aperture in said smallest tube's third wall's groove into said smallest tube, expansion of said smallest tube stopped when said fifth and sixth pins abut.

7. The telescoping device with stop mechanism according to claim 6 wherein said tubes include, additionally, one flat wall, said flat wall including indicia on its exterior.

* * * * *